United States Patent
Deppe et al.

(10) Patent No.: US 7,029,062 B2
(45) Date of Patent: Apr. 18, 2006

(54) GUIDE ARRANGEMENT FOR DISPLACEABLE PARTS OF MOTOR VEHICLE ROOFS AND PROCESS FOR THE PRODUCTION THEREOF

(75) Inventors: Michael Deppe, Munich (DE); Attila Güven, Weilheim (DE); Marc Hajek, Munich (DE); Christian Walkowiak, Kaufering (DE); Andreas Feuerle, Dorschhausen (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 10/910,767

(22) Filed: Aug. 4, 2004

(65) Prior Publication Data
US 2005/0062317 A1    Mar. 24, 2005

(30) Foreign Application Priority Data
Aug. 4, 2003  (DE) ............... 103 35 668

(51) Int. Cl.
*B60J 7/02*    (2006.01)
(52) U.S. Cl. .................. 296/216.08
(58) Field of Classification Search ........... 296/216.07, 296/216.08
See application file for complete search history.

(56) References Cited

U.S. PATENT DOCUMENTS

| 5,419,970 A | 5/1995 | Hattori et al. |
|---|---|---|
| 6,410,144 B1 | 6/2002 | Dearnaley et al. |
| 6,857,694 B1 * | 2/2005 | Radmanic .............. 296/216.08 |

FOREIGN PATENT DOCUMENTS

| DE | 41 07 129 C1 | 6/1992 |
|---|---|---|
| DE | 198 57 814 A1 | 12/2000 |
| DE | 199 41 626 C1 | 2/2001 |

* cited by examiner

*Primary Examiner*—Dennis H. Pedder
(74) *Attorney, Agent, or Firm*—David S. Safran

(57) ABSTRACT

A guide arrangement for displaceable parts of motor vehicle roofs with at least one guide along which at least one slide body is movably guided, the guide being a guideway made of aluminum or of an aluminum alloy on which the at least one slide body slides, a surface layer of which has an anodized layer into which at least one lubricant has been incorporated. A process for producing the guide arrangement involves anodizing the guideway of aluminum or of an aluminum alloy and immersing it in a lubricant-containing bath so that the lubricant becomes incorporated into the anodized layer.

7 Claims, 1 Drawing Sheet

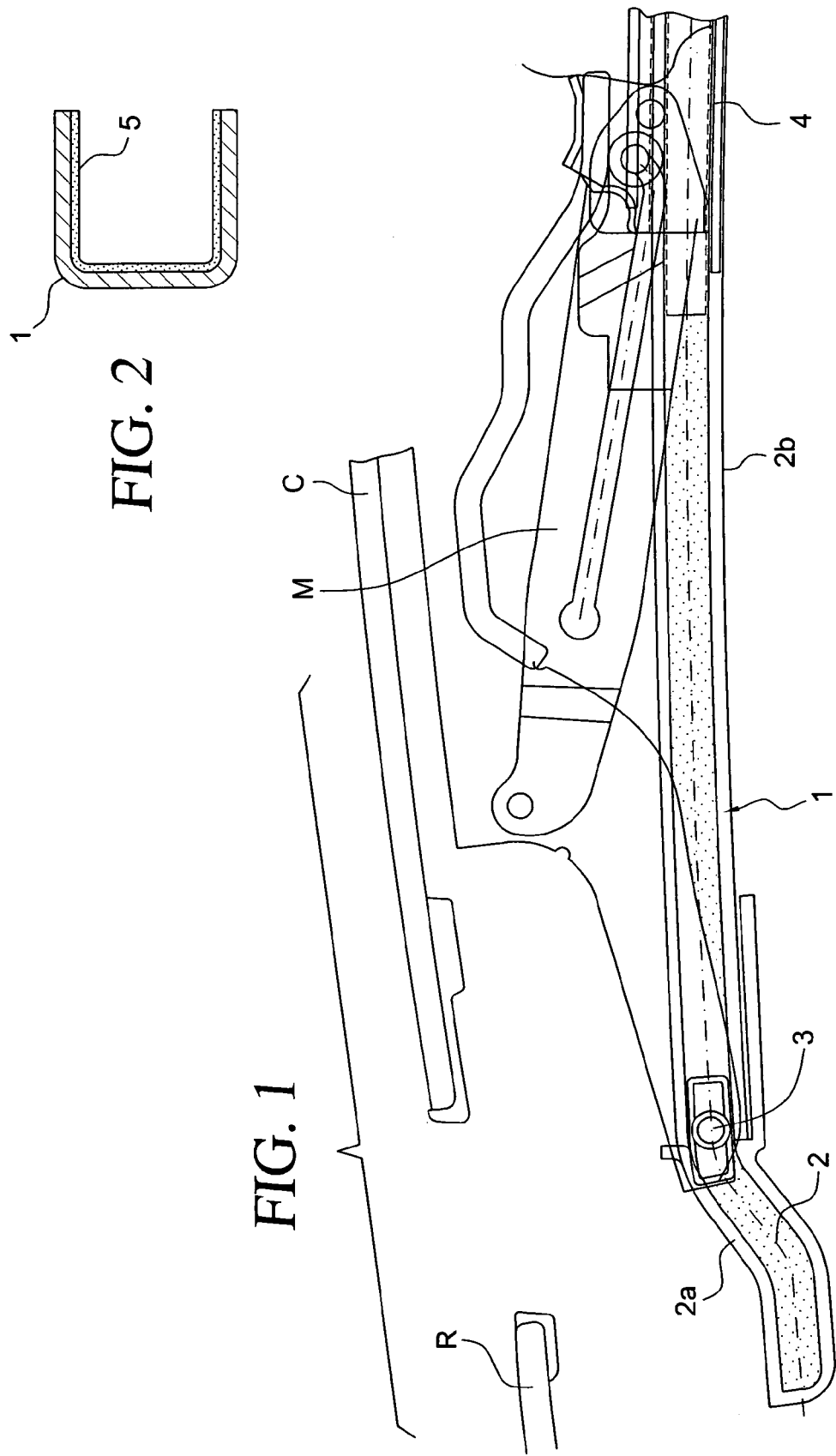

GUIDE ARRANGEMENT FOR DISPLACEABLE PARTS OF MOTOR VEHICLE ROOFS AND PROCESS FOR THE PRODUCTION THEREOF

BACKGROUND OF THE INVENTION

1. Field of the Invention

This invention relates to a guide arrangement for displaceable parts of motor vehicle roofs with at least one guide along which at least one slide body is movably guided and a corresponding production process.

2. Description of Related Art

Guide arrangements for displaceable parts of motor vehicle roofs are known in the most varied execution. They often comprise a guide rail in which a sliding body is movably guided. In order to reduce the associated friction, for example, published German Patent Application DE 198 57 814 A1 discloses a slide rail for motor vehicle components which has a slide coating which consists of at least one layer. The process used there for producing such a slide rail calls for the slide coating to be applied continuously to the metal strip, for the coated strip to be cut to length and width, and for the cut strip sections to be shaped. The slide coating can be a plastic such as, for example, polytetrafluorethylene (PTFE).

U.S. Pat. No. 6,410,144 discloses a friction-reducing coating of an anodized surface with an amorphous film of carbon by vacuum vapor coating. U.S. Pat. No. 5,419,970 describes the coating of an anodized surface with PTFE. German Patent DE 199 41 626 C1 discloses the incorporation of PTFE into the pores of an anodized surface, the process being used to lubricate the piston of a combustion engine, which piston is made of an aluminum alloy.

A guide arrangement for displaceable parts of motor vehicle roofs of the type initially mentioned is disclosed in German Patent DE 41 07 129 C1, in which a slide rail in the area which comes into sliding contact with a slide body is coated with a solid lubricant. Preferably, the solid lubricant is an organic solid lubricate such as, for example, PTFE. The slide rail is made of a metal such as, for example, aluminum or an aluminum alloy, but can also be made of plastic. The solid lubricant is contained in a layer which is applied separately to the surface of the slide rail and it is applied in the form of a baking slide varnish or it is dissolved together with the binder in a solvent and the slide rail to be coated is dipped into the solvent. After drying, a layer of binder and solid lubricant which covers the slide rail remains.

The disadvantage in these coatings of guide arrangements is the comparatively great thickness of the layer and a certain susceptibility to wear.

SUMMARY OF THE INVENTION

The object of this invention is to devise a guide arrangement for adjustable parts of motor vehicle roofs in which the guideway is very thin and wear-resistant and moreover is cheap and easy to produce.

This object is achieved in accordance with the invention by a guide arrangement for adjustable parts of motor vehicle roofs the guide contains a guideway of aluminum or of an aluminum alloy on which a slide body slides and on the surface of which an anodized layer is provided into which at least one lubricant is incorporated. This object is also achieve by a process for producing such a guide arrangement in accordance with the invention by which the guideway of aluminum or of an aluminum alloy is anodized and is immersed in a lubricant-containing bath, the lubricant being incorporated into the anodized layer.

BRIEF DESCRIPTION OF THE DRAWINGS

FIG. 1 is a side view of a section of a guide arrangement in accordance with the present invention.

FIG. 2 is a cross-sectional view of a guideway of the guide arrangement shown in FIG. 1 on an enlarged scale.

DETAILED DESCRIPTION OF THE INVENTION

By the approach in accordance with the invention, the guide arrangement contains a guide 1 with a guideway 2 that is made of aluminum or of an aluminum alloy and on which at least one slide body 3, 4 slides. The surface of the guideway has been anodized and has a lubricant incorporated into the anodized layer 5. According to one preferred embodiment, the lubricant can be a liquid lubricant such as, for example, an oil or also a solid lubricant, such as, for example, PTFE or graphite. Since the lubricant as utilized in accordance with the invention is not contained in a separate, additional layer on the guideway, but is incorporated in an outer area of the anodized layer, which area is 4 to 20 microns thick, it is protected from overly intense surface abrasion. Moreover, there is the advantage of very high dimensional stability of the guideway. Thus, it is even possible to provide a guideway which has been subsequently provided with an anodized layer with a lubricant in this way or to renew the incorporation of the lubricant without the need to apply a coating which could lead to operating problems in the moving parts due to its thickness. Viewed microscopically, with this invention, the lubricant is incorporated into the pores of the anodized layer which are open towards the surface, which layer has a scale-like consistency.

The guideway 2 can be made as a slide rail for linear motion (segment 2a) or also with a curved path (segment 2b). One application for the latter embodiment is, for example, guideways for the roof mechanisms of convertible roofs and another is for vehicle sunroofs. With regard to sunroof applications, FIG. 1 shows one example. In FIG. 1, the fixed roof of the vehicle is designated R and a cover panel C for selectively opening and clearing an opening in the fixed roof R is carried by a lifting and displacing mechanism M the nature in operation of which forms no part of this invention apart from the fact that it is mounted on the slide bodies 3, 4. In this regard, it is especially advantageous if the slide bodies are made of HDPE (high density polyethylene), by which especially low friction values arise between the slide rail 1 and slide bodies 3, 4.

To incorporate the lubricant, in accordance with the invention, a process is used in which the guideway of aluminum or an aluminum alloy is anodized and is immersed in a lubricant-containing bath, by which the lubricant is incorporated into the anodized layer. The anodizing of the surface is a practical process for increasing the wear resistance of aluminum components and therefore is not performed solely for the incorporation of the lubricant. Thus, in general there are therefore no additional costs for anodizing since such would likely be done in any event.

Preferably, the lubricant bath is a colloid within which the lubricant is dispersed. Here, in different embodiments the anodizing bath can be used at the same time as the lubricant bath or the slide rail after immersion in the anodizing bath is then immersed in a separate lubricant bath. Subsequent compression of the anodized layer after incorporating the lubricant is also advantageous. This process step, which is carried out in a water bath, is also a standard process in anodizing for increasing the wear resistance of the anodized layer and thus need not be considered an additional process step. The incorporation of these lubricants into the slide rail leads not only to especially low sliding friction between the slide rail and the slide body, by which the slide rail needs to be lubricated less, but it is also very permanent so that cyclical relubrication is no longer necessary. Depending on the application, additional lubrication between the sliding partners can be even completely eliminated. In addition to reducing the wear of the slide partners, the invention results in distinctly reduced noise formation.

What is claimed is:

1. Guide arrangement for displaceable parts of motor vehicle roofs, comprising:
    at least one guide, and
    at least one slide body is movably guided to slide along the at least one guide,
    wherein the guide comprises a guideway made of aluminum or of an aluminum alloy, a surface layer of the guideway being an anodized layer into open pores of which at least one lubricant has been incorporated.

2. Guide arrangement as claimed in claim 1, wherein the lubricant is PTFE.

3. Guide arrangement as claimed in claim 1, wherein the lubricant is incorporated into an outer 4 to 20 microns of the anodized layer.

4. Guide arrangement as claimed in claim 1, wherein the lubricant is incorporated into outwardly open pores in the anodized layer.

5. Guide arrangement as claimed in claim 1, wherein the at least one slide body is made of high density polyethylene (HDPE).

6. Guide arrangement as claimed in claim 1, wherein the guideway is a guide rail.

7. Guide arrangement as claimed in claim 1, wherein the guideway is curved at least in part.

* * * * *